US009063969B2

(12) United States Patent
Lee et al.

(10) Patent No.: US 9,063,969 B2
(45) Date of Patent: Jun. 23, 2015

(54) DISTRIBUTED TRANSACTION MANAGEMENT USING OPTIMIZATION OF LOCAL TRANSACTIONS

(75) Inventors: Juchang Lee, Seoul (KR); Michael Muehle, Walldorf (DE); Jaeyun Noh, Seoul (KR)

(73) Assignee: SAP SE, Palo Alto, CA (US)

( * ) Notice: Subject to any disclaimer, the term of this patent is extended or adjusted under 35 U.S.C. 154(b) by 519 days.

(21) Appl. No.: 12/980,208

(22) Filed: Dec. 28, 2010

(65) Prior Publication Data

US 2012/0167098 A1 Jun. 28, 2012

(51) Int. Cl.
*G06F 9/46* (2006.01)
*G06F 17/00* (2006.01)
*G06F 17/30* (2006.01)

(52) U.S. Cl.
CPC ................................ *G06F 17/30377* (2013.01)

(58) Field of Classification Search
None
See application file for complete search history.

(56) References Cited

U.S. PATENT DOCUMENTS

2002/0124083 A1* 9/2002 Jeyaraman et al. ........... 709/225
2002/0133507 A1* 9/2002 Holenstein et al. ........... 707/200
2005/0004952 A1* 1/2005 Suzuki et al. ................. 707/200
2005/0228834 A1* 10/2005 Shinkai ......................... 707/202
2006/0218206 A1* 9/2006 Bourbonnais et al. ........ 707/202
2009/0106323 A1* 4/2009 Wong et al. ................... 707/201
2009/0157766 A1* 6/2009 Shen et al. .................... 707/202
2009/0217274 A1* 8/2009 Corbin et al. ................. 718/101
2010/0023454 A1* 1/2010 Exton et al. .................... 705/44
2010/0211554 A1* 8/2010 Reid et al. ..................... 707/703
2011/0246503 A1* 10/2011 Bender et al. ................. 707/769
2012/0005154 A1* 1/2012 George et al. ................. 707/607

* cited by examiner

*Primary Examiner* — Tammy Lee
(74) *Attorney, Agent, or Firm* — Mintz Levin Cohn Ferris Glovsky and Popeo, P.C.

(57) ABSTRACT

A computer-implemented method, a computer program product, and a system are provided. A transaction master for each of a plurality of transactions of a database is provided. Each transaction master is configured to communicate with at least one transaction slave to manage execution a transaction in the plurality of transactions. A transaction token that specifies data to be visible for the transaction on the database is generated. The transaction token includes a transaction identifier for identifying whether the transaction is a committed transaction or an uncommitted transaction. The transaction master is configured to update the transaction token after execution of the transaction. A determination whether the transaction can be executed on the at least one transaction slave without accessing data specified by the transaction token is made. The transaction is executed on the at least one transaction slave using a transaction token stored at the at least one transaction slave.

10 Claims, 6 Drawing Sheets

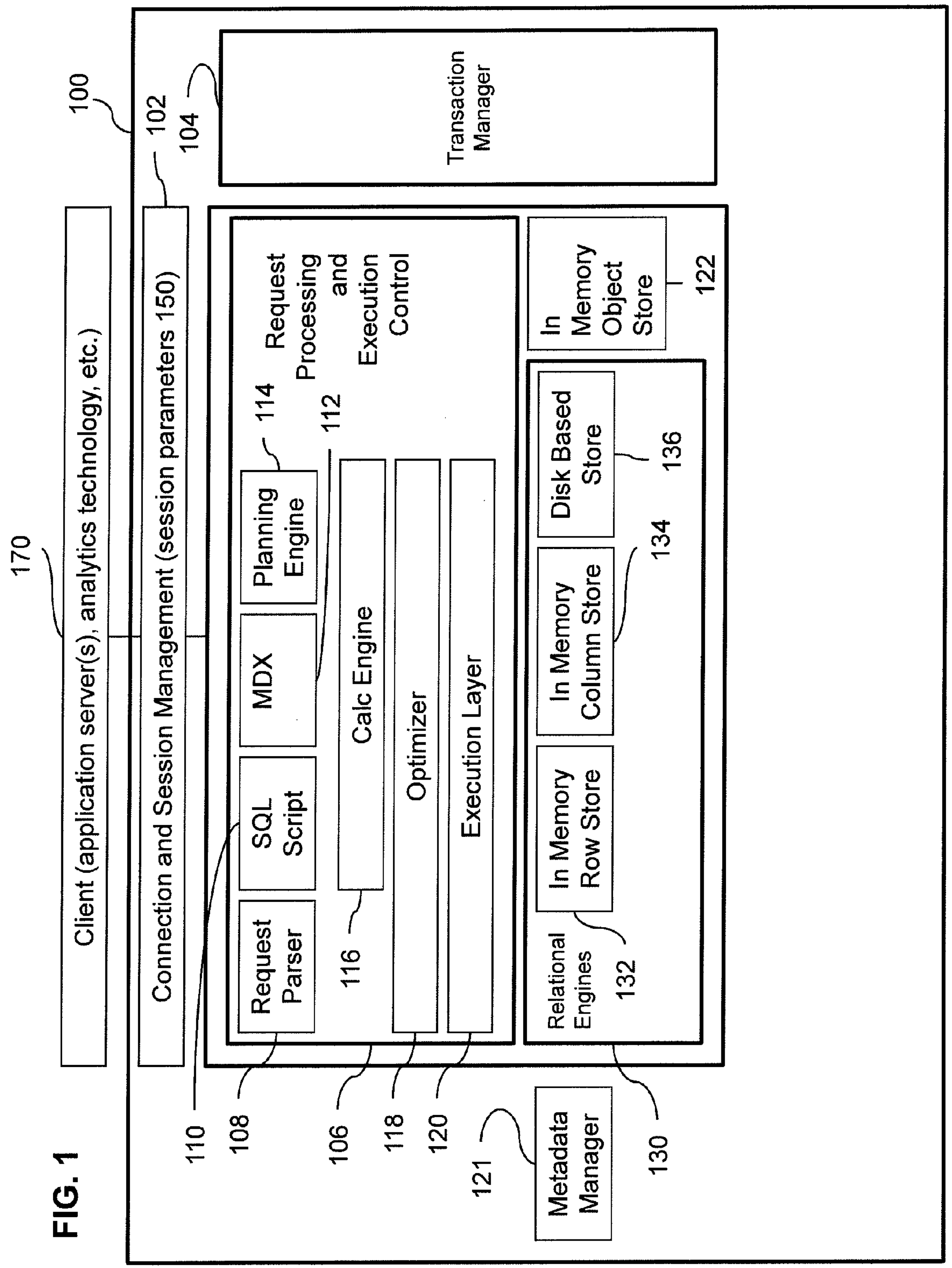
FIG. 1
100
170
Client (application server(s), analytics technology, etc.)
102
Connection and Session Management (session parameters 150)
104
Transaction Manager
Request Processing and Execution Control
114
112
Planning Engine
MDX
SQL Script
Request Parser
Calc Engine
116
Optimizer
Execution Layer
110
108
106
118
120
121
Metadata Manager
In Memory Object Store
122
Disk Based Store
136
134
In Memory Column Store
In Memory Row Store
Relational Engines
132
130

400
Master Transaction Manager
402
Global Transaction Token
404
Slave Transaction Manager
406
Cached Transaction Token
408

DISTRIBUTED TRANSACTION MANAGEMENT USING OPTIMIZATION OF LOCAL TRANSACTIONS

TECHNICAL FIELD

The subject matter described herein relates to data processing and in particular, to distributed transaction management using optimization of local transactions.

BACKGROUND

In the past, database management systems were designed for optimizing performance on hardware with limited amounts of main memory and with the slow disk access, both of which served as bottlenecks. The focus was thus on optimizing disk access, for example, by minimizing the number of disk pages to be read in to main memory, when processing a query.

Today, computer architecture has, however, changed. Using multi-core central processing units ("CPUs"), parallel processing may be possible with fast communication between processor cores (via main memory or shared cache). Main memory is no longer a limited resource. Modern computer architectures create new possibilities but also new challenges. With most, if not all, relevant data stored in memory, disk access is no longer a limiting factor for performance. With the increasing number of processing cores, CPUs will be able to process more and more data per unit interval of time.

Conventional database transactions occur between a transactional engine and a database, in which the transactional engine queries the database to create, retrieve, update, delete, insert, and the like data (e.g., a record) at the database. However, problems may occur when database transactions become distributed, i.e., when two transactional engines are used or when the transaction runs on more than one physical instance. These problems may include difficulty in identifying committed and uncommitted transactions, which are in progress. For example, even though two transactions are executed in parallel, a later, second transaction may need to know which of the records have been committed in an earlier transaction to ensure that the correct data is being used.

SUMMARY

In some implementations, a computer-implemented method includes providing a transaction master for each of a plurality of transactions of a database. Each transaction master is configured to communicate with at least one transaction slave to manage execution a transaction in the plurality of transactions. A transaction token that specifies data to be visible for the transaction on the database is generated. The transaction token includes a transaction identifier for identifying committed transactions and uncommitted transactions. The transaction master is configured to update the transaction token after execution of the transaction. A determination whether the transaction can be executed on the at least one transaction slave without accessing data specified by the transaction token is made. The transaction is executed on the at least one transaction slave using a transaction token stored at the at least one transaction slave.

In some implementations, the following features may be optionally included. The transaction token may be cached at the at least one transaction slave. A determination may be made whether the transaction can be executed without accessing at least another transaction slave and the transaction may be executed using the cached transaction token on the at least one transaction slave. The cached transaction token may be updated using a new transaction token, wherein the new transaction token is a transaction token corresponding to a transaction committed on the at least one transaction slave. The transaction token may be a global transaction token maintained by the transaction master. A determination may be made whether execution of the transaction uses at least another transaction slave and the transaction may be executed using the global transaction token on the transaction master. The cached transaction token may be updated using a new transaction token, wherein the new transaction token is a transaction token includes at least one of the following: corresponding to a transaction committed on the at least one transaction slave and a transaction token provided by the transaction master.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 illustrates an exemplary system for managing transactions in a distributed processing system, according to some implementations of the current subject matter;

DETAILED DESCRIPTION

Figure 2:
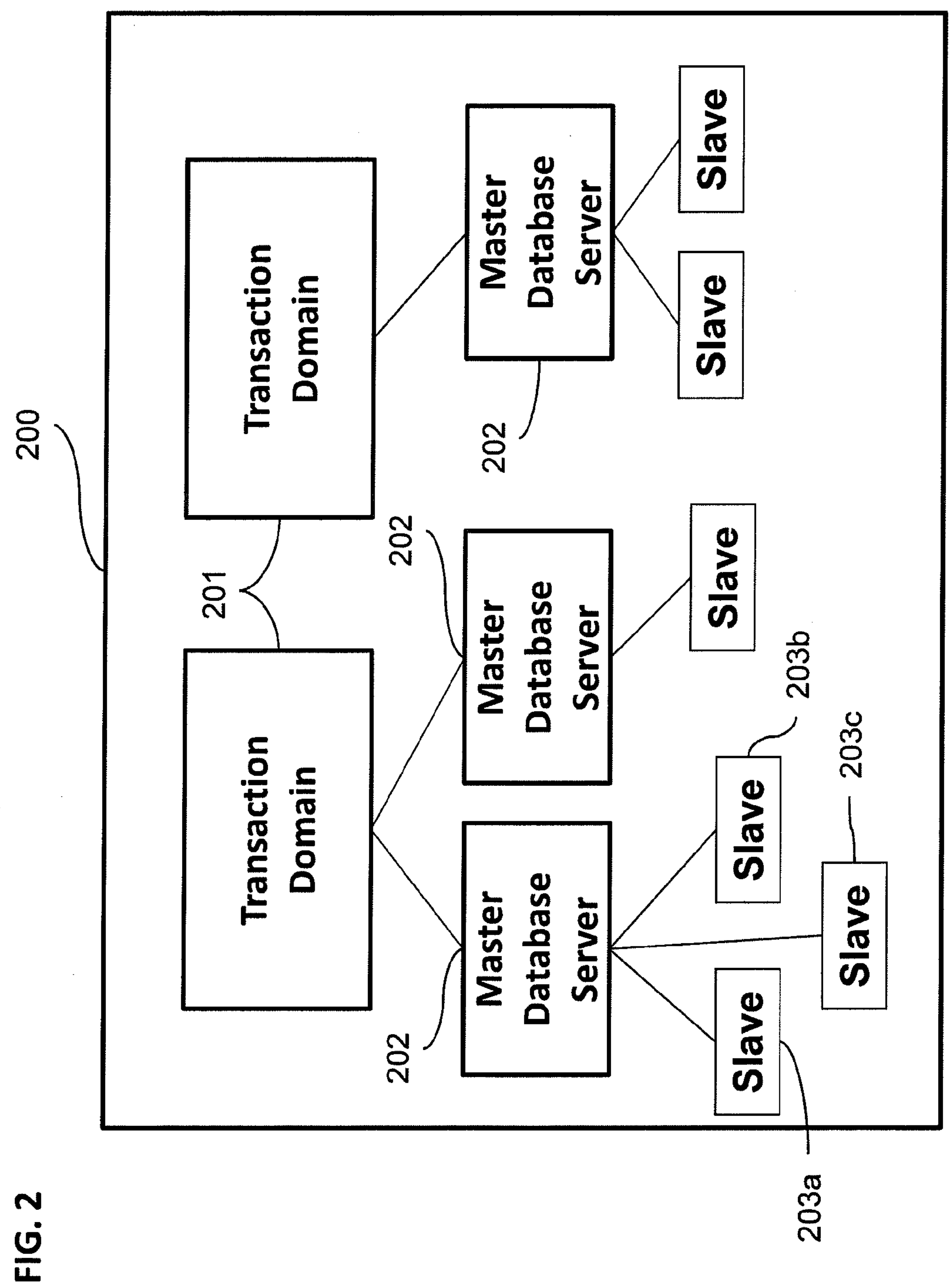
FIG. 2 illustrates an exemplary master-slave transaction management in a distributed processing system, according to some implementations of the current subject matter.

FIG. 1 illustrates an exemplary database processing system 100, according to some implementations of the current subject matter. In some implementations, client 170 (e.g., an application server, an analytics application, and/or any other client application accessing system 100) may communicate with system 100 to process various transactions. The system 100 may include connection and session management component 102, request processing and execution control components layer 106, relational engines 130, transaction manager 104, and a metadata manager component 121.

The connection and session management component 102 may create and manage sessions and connections for database clients 170. For each session, a set of session parameters 150 may be maintained, such as auto-commit settings and/or a current transaction isolation level. Once a session is established, a database client 170 may use structured query language ("SQL") statements to communicate with the system 100.

In some implementations of system 100, each statement may be processed in a context of a transaction. New sessions may be implicitly assigned to a new transaction. For such purposes, the transaction manager 104 may coordinate the transactions of system 100, control transactional isolation, and keep track of any running and/or closed transactions. When a transaction is committed or aborted ("rolled back"), the transaction manager 104 may inform any involved elements of system 100 about the commit or abort. When a transaction is committed, recoverable, durable resources are placed in their final states. When transaction is aborted, recoverable resources are placed in their initial states.

Client 170 may send a request, which is analyzed and executed by the request processing and execution control components layer 106. The components in the request processing and execution control components layer 106 may include a request parser component 108, an SQL script component 110 for handling SQL statements including script, a multidimensional expression (MDX) component 112 for handling MDX queries, a planning engine 114 for built-in support for domain-specific models (e.g., for financial planning), a calculation engine 116 for generating an execution plan based on queries/statements received from 108, 110, 112, and 114, an optimizer component 118, and an execution layer 120.

The request parser 108 may be configured to analyze a client request and dispatch the request to responsible elements within system 100. For example, transaction control statements may be forwarded to the transaction manager 104, data definition statements may be dispatched to the metadata manager component 121, and object invocations may be forwarded to a memory object store 122. Data manipulation statements may be forwarded to the optimizer 118, which may create an optimized query execution plan that may be provided to the execution layer 120.

The execution layer 120 may act as the controller that receives a query execution plan and invokes relational database engines, routing any intermediate results to temporary storage or another execution operation.

The metadata manager component 121 may be configured to access metadata having a variety of objects. Examples of such metadata may include definitions of relational tables, columns, views, and indexes, definitions of SQL script functions and object store metadata. Metadata of all these types may be stored in one common catalog for all system 100 stores (e.g., in-memory row store 132, in-memory column store 134, object store 122, disk based 136). System 100's metadata may be stored in tables in a row store. The metadata manager 121 may be configured to provide transaction support, multiversion concurrency control, and other functionalities.

The relational database engines (labeled "relational engines") 130 may be configured to include various relational database engines, such as an in-memory row store 132, an in-memory column store 134, a disk-based store 136 and in-memory object store 122. The phrase "in-memory" refers to storing most, if not all, of the relevant data of a database in memory, such as random access memory, dynamic access memory, and the like rather than store the relevant data in slower, persistent storage mechanisms, such as an electromechanical disk drive or an optical storage device. The row store engine 132 may be configured to store data in a row-based manner, providing thus a row-store database. The column store engine 134 may be configured to store data in column-based manner, providing thus a column-store database.

In some implementations, disk-based store 136 may be configured as well to provide a persistent database and to handle persistent database operations not handled in memory row store and column store 132 and 134. Data in persistent disk-based store 136 may be primarily stored on an electromechanical disk drive and/or an optical disk storage device.

The object store 122 may also be an in-memory database storing graph-like structures in memory. These graph structures may be represented by networks of objects and may be used for optimization and planning tasks that operate on large volumes of graph-like data, for example, in supply chain management.

In some implementations, isolation of concurrent transactions may be a requirement for correct execution of transactions. Without transactional isolation, it is possible that concurrent transactions may read an inconsistent, intermediate state written by some transactions or a state caused by a transaction that is later aborted (a "dirty read"). The system 100 may include a multiversion concurrency control ("MVCC") that may ensure consistent read operations among the relational database engines 130 and/or among systems 100. With multiversion concurrency control, concurrent read operations may have a consistent view of the database without blocking concurrent write operations. This approach may be configured to provide a higher degree of concurrency compared to concurrency control based on shared read-locks. With multiversion concurrency control, updates may be implemented not by overwriting existing records but by inserting new versions. A transaction may write a new version of some data item while concurrent transactions still have a read-access to previous versions. A timestamp (or equivalent mechanism) may be associated with each version. This information may be used to determine which versions are visible for which transactions. Deletions may be implemented by inserting a deletion version or by some other mechanism that indicates that the previous version is no longer visible to subsequent transactions.

MVCC may be used to implement different transaction isolation levels. The system 100 may be configured to support transaction level snapshot isolation and statement level snapshot isolation. With transaction level snapshot isolation, all statements of a transaction may see the same snapshot of a database. This snapshot may contain all changes that were committed at the time the transaction started (plus the changes made by the transaction itself). This form of snapshot isolation may be implemented using SQL isolation level "repeatable read." With statement level snapshot isolation, different statements in a transaction may see different snapshots of the data in the database. Specifically, each statement may see changes that were committed when the execution of the statement started. This isolation level may correspond to SQL transaction isolation level "read committed."

To keep track of transactions and to implement timestamps for multiversion concurrency control, a transaction manager, such as transaction manager 104, may maintain two sequences of identifiers: a transaction identifier and a commit identifier. The transaction identifier ("TID") may be an integer number representing a sequence of starting points of write transactions. The TID may be increased when a write transaction starts or when a read transaction is transformed into a write transaction. Transactions processed by the system 100 may be read transactions or write transactions. A transaction may start as a read transaction but it may be promoted to a write transaction using the transaction manager 104. The TID may be assigned to the write transaction as its unique identifier. The TID may be used to store a transaction that made an uncommitted change. The commit identifier ("CID") may be an integer number reflecting a commit sequence of write transactions. The transaction manager 104 may internally keep a maximum commit identifier, which may be a sequence number of a most recent commit. When a transaction is committed, the maximum commit identifier may be increased and a new value may be assigned to the committed transaction. The CID may be equivalent to a commit timestamp. The transaction manager 104 may maintain a table that may map CID integer numbers to the actual timestamps.

To provide the consistent view for a transaction or a statement, the system 100's engines (e.g., row store, column store, object store engines, and the like) may be configured to require different information about the state of other transactions at the time the transaction or statement is started to determine the consistent view. For example, the row store engine 132 may be configured to use CIDs, and the column store engine 134 may be configured to use logic based on transaction start sequence numbers, i.e., TIDs. A transaction token may be configured to include all the information needed to construct a consistent view of a transaction. It may be passed as additional context information to operations and/or engines that may be involved in the processing of a transaction or execution of a statement.

The transaction manager 104 may be configured to maintain a central transaction token. When a read transaction is started, a copy of the central transaction token may be assigned to that transaction. The central token may be updated whenever a relevant event occurs (such a start or an end of a write transaction). Multiple read transactions started consecutively may get copies of the same transaction token. As the transaction token also contains a unique TID of a write transaction, each of the write transactions may have different transaction tokens.

FIG. 2 illustrates an exemplary distributed database system 200, according to some implementations of the current subject matter. The system 200 may include at least one database server 202 that includes most, if not all, of the components of system 100 shown and discussed in connection with FIG. 1 above. The database server 202 may include a separate operating system process and include its own disk volume(s). The database server 202 of the system 200 may be distributed across multiple hosts, although multiple database servers 202 may be executed in one host as well. During processing of database operations, database servers 202 may forward execution of some operations to other database servers that own data involved in the operation.

To ensure transactional consistency in distributed implementation depicted at FIG. 2, the system 100 may be configured to support distributed transactions. The system 100 may have multiple transaction domains 201 to which the database servers 202 of the system 100 may be uniquely assigned. Distributed transactions may span only database servers 202 within the same transaction domain 201. In a transaction domain 201, there may be one database server 202 that may have a role of a transaction master, while other database servers may act as transaction slaves 203 (*a, b, c*). In a transaction domain, the transaction tokens may be centrally managed by the transaction master. The transaction master may be configured to maintain a list of open transactions and increase the timestamp sequences, such as transaction ID and commit ID. The transaction master may also coordinate distributed commit operations, as shown in FIG. 3.

Figure 3:
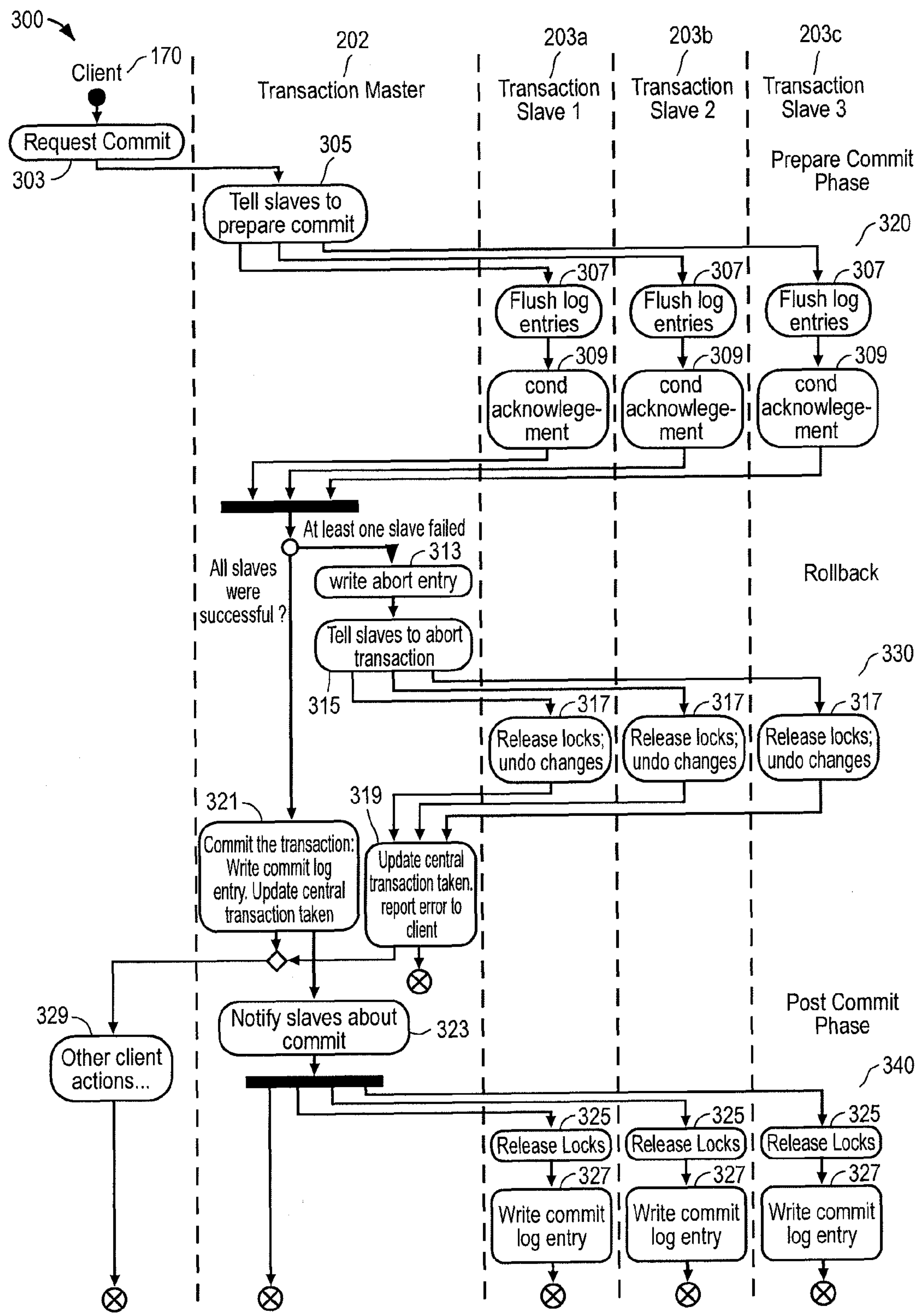
FIG. 3 illustrates an exemplary process for managing transactions, according to some implementations of the current subject matter.

FIG. 3 illustrates an exemplary process flow 300 for committing a transaction that may be handled by a transaction master, which may be one of the master database servers 202 shown in FIG. 2. To commit a transaction, the transaction master 202 may be configured to interact with transaction slaves 203 (*a, b, c*). A request 303 to commit a transaction may be generated by the client 170 and received by the system 100 (shown in FIG. 1). In some implementations, the transaction master 202 may include or otherwise be implemented as transaction manager 104 and the transaction slaves 203 (*a, b, c*) may be implemented as other database servers.

The system 300 may be configured to operate in three phases: prepare commit phase 320, rollback phase 330, and post commit phase 340. The client 170 may be configured to initiate a commit request 303 and forward it to the transaction master 202, thereby initiating the prepare commit phase 320. The transaction master 202 may then instruct the slaves 203 to prepare commit transaction. Each slave 203 may flush log entries (at 307) and generate an acknowledgement receipt (at 309) to the transaction master 202, thereby ending the prepare commit phase 320. At this point, the rollback phase 330 may be initiated. If all slaves 203 were successful during the prepare commit phase 320, the transaction is committed (at 321) and a commit write log entry is written along with an update to a transaction token corresponding to the transaction. The client 170 may be informed of the commit by the transaction master 202 generating an acknowledgement, at which point the client 170 may proceed with its other actions (at 329). The acknowledgement may be forwarded to the client during the post commit phase 340. The transaction master 202 may also notify (at 323) the slaves 203 about sending an acknowledgement to the client 170. Then, the slaves 203 may release any locks (at 325) and create write commit log entries (at 327). The slaves may perform these operations during the post commit phase 340.

If during the prepare commit phase 320, one of the slaves 203 has failed, then a write abort log entry 313 may be created by the transaction mater 202, and the transaction master 202 informs slaves to abort the transaction (at 315). The slaves 203 may release any locks and undo changes made to any data (at 317). The transaction master 202 may then generate an error report to the client and update central transaction token corresponding to the transaction (at 319).

In some implementations, the system 300 may be configured to implement a two-phase commit operation that may operate as follows. When a commit is requested by an application, the central transaction master 202 may instruct all involved transaction slaves to prepare a commit operation, as shown in FIG. 3. The transaction slaves 203 (*a, b, c*) may prepare the commit operation by ensuring that log queue entries are flushed to disk. After this is successfully completed, the transaction slaves may send an acknowledgement back to the transaction master. When all transactions slaves 203 (*a, b, c*) have acknowledged successful commit preparation, the transaction master 202 may complete the commit operation by writing the commit log entry and updating the central transaction token. At this point, the transaction may be committed. In case of a crash, it may be redone from the logs and with the update of the central transaction token, the changes may be visible to other transactions. A positive result may be returned to the client that called the commit operation.

In the post commit phase, the transaction master may send asynchronous commit notifications to the transaction slaves. The transaction slaves 203 (*a, b, c*) may release the locks held for this transaction and write commit entries to their logs. Writing commit entries to the log of the transaction slaves may be an optimization to reduce startup time. During restart, these local commit entries may allow the transaction slaves to detect locally that a transaction was committed. If the local commit entry is missing during startup (e.g., because the slave crashed before it was written), the slave may ask the transaction master whether the transaction was committed or not.

If prepare commit fails for at least one of the transaction slaves, the transaction master may decide to rollback the transaction (phase 330 of FIG. 3). To execute a rollback, the transaction master may first write the rollback record to the log. This ensures that the transaction may be rolled back if the system crashes before the next save point. Then, the transaction master may send abort requests to the involved transaction slaves. The transaction slaves may perform a local rollback by releasing all locks and ensuring that the changes done as part of the transaction are not visible anymore. Then, they may send an acknowledgement to the transaction master. After all transaction slaves have acknowledged the rollback, the transaction manager may mark the transaction as closed in the central transaction token.

Figure 4:
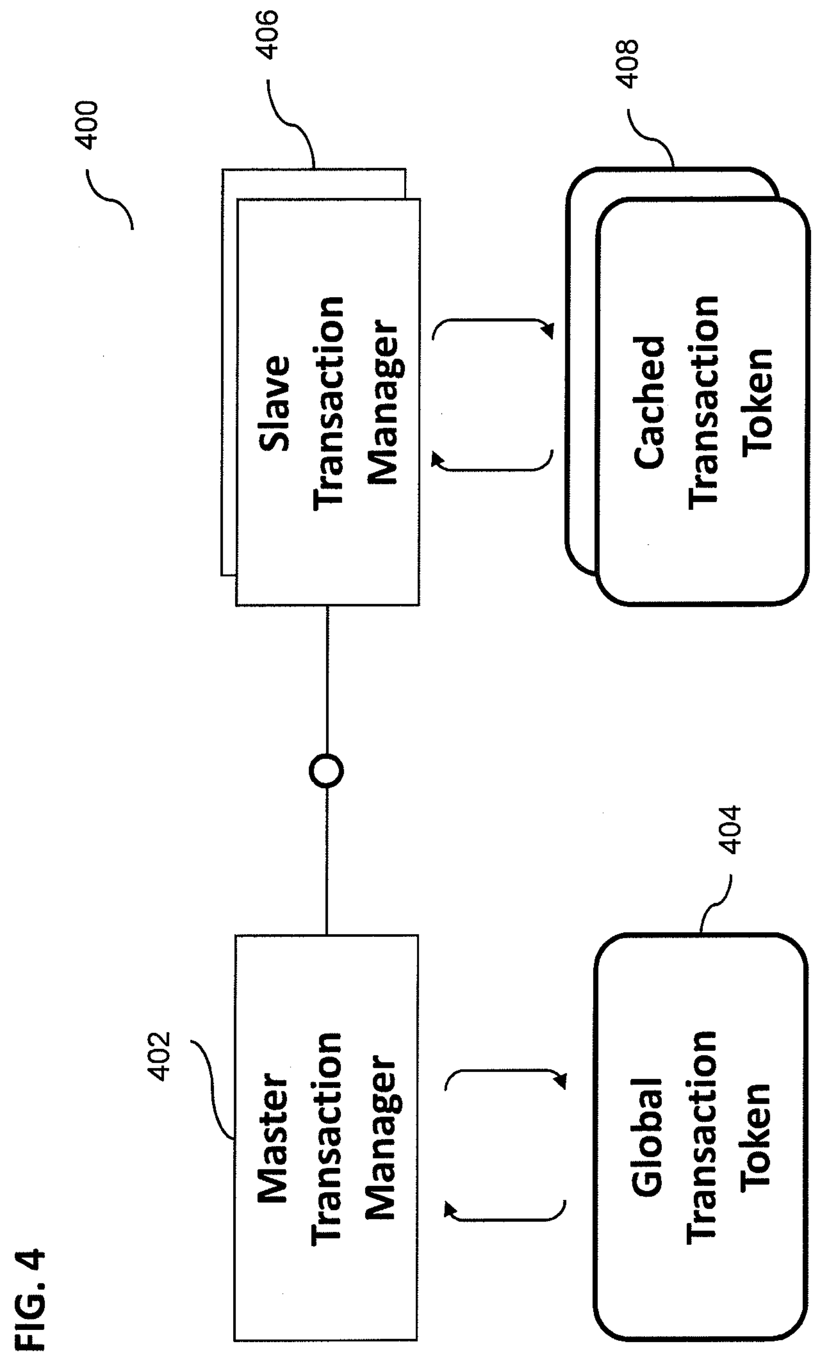
FIG. 4 illustrates an exemplary system for optimizing transaction management in distributed processing systems using transaction slave token caching, according to some implementations of the current subject matter.

FIG. 4 illustrates an exemplary system 400 for optimizing transaction management using transaction slave's transaction token caching, according to some implementations of the current subject matter. The system 400 includes master transaction manager 402, which may be included in the master database server 202 (shown in FIG. 2), and a slave transaction manager 406, which may be included in the transaction slave 203 (also shown in FIG. 3). The master transaction manager 402 may be configured to maintain a global transaction token 404. The slave transaction manager 406 may be configured maintain cached transaction token 408. The system 400 may include multiple slave transaction managers 406 corresponding to multiple transaction slaves 203, where each slave transaction manager 406 may be configured to maintain a cached transaction token 408. In some implementations, the system 400 may assume a statement-level snapshot isolation (e.g., read committed), which may be a default isolation mode. The master transaction manager 402 may coordinate transaction processing with slave transaction managers 406. Every update transaction accesses the master transaction manager 402 to access and update the global transaction token 404. However, read-only statements may start with its cached local transaction token 408. This local transaction token may be refreshed by the transaction token of an update transaction when the transaction is committed on the transaction slave or by the transaction token of a 'global statement' when the transaction token is received by the slave transaction manager 406.

If the statement, such as a query statement, does not need to access any other transaction slave, the statement may finish with the cached transaction token 408, that is, without any access to the master transaction manager 404. However, if the statement should be also executed on another transaction slave 203 (not shown in FIG. 4), the statement may be switched to a 'global statement' type. Then, the current statement may be retried with the global transaction token 408 by accessing the master transaction manager 402. Statement's tokens may be refreshed using existing local transaction tokens ("TT1") and new transaction token ("TT2"). In the column store (or open transaction-ID list), the tokens may be refreshed using a union of TT1 and TT2. In the row store (or commit-ID), the tokens may be refreshed using a maximum value of TT1 and TT2.

During an update to the transaction commit, after the global transaction token is updated at the master transaction manager 402, its updated global token may be delivered to the slave transaction manager 406, where the global token may be cached (as indicated at 408). The transaction token TT1 may be carried by a global statement from the master transaction manager 402 to the slave transaction manger 406. The transaction token TT2 may be carried by a local statement of the slave transaction manager 406 and may include different states. If a statement carrying transaction token TT1 is started ahead of a statement carrying transaction token TT2, a local transaction token on the slave transaction manager 406 may be refreshed using TT1. Otherwise, statement carrying transaction token TT2 may see data as uncommitted, whereas statement carrying transaction token TT1 and all the other following statements may see the data as committed, which does not incur any inconsistencies to users. Single-transaction-slave read-only statements (or transactions including those statements) may not need to access the master transaction manager at all because they are performed by the transaction slave. This may, in some implementations, avoid performance bottleneck at the master transaction manager 402 and reduce performance overhead of single-transaction-slave statements/transactions.

Figure 5:
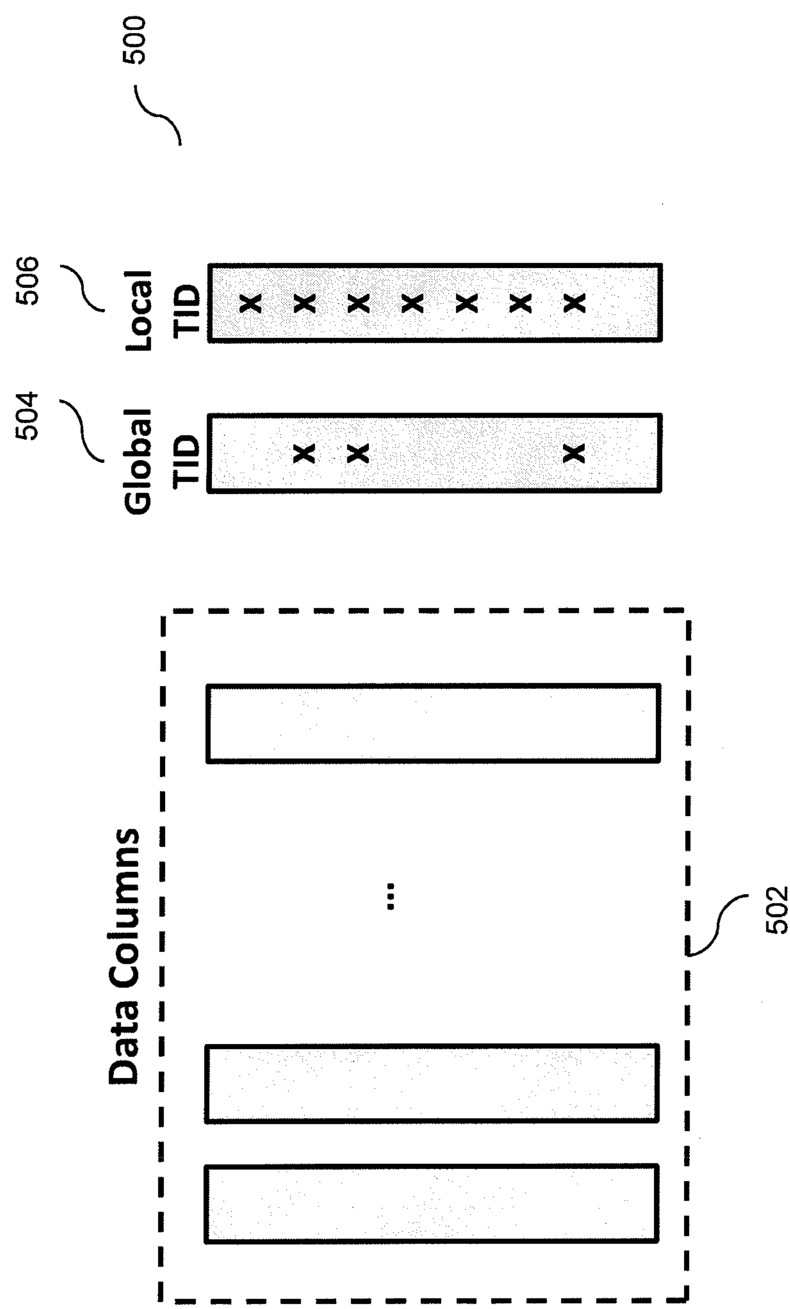
FIG. 5 illustrates an exemplary system for optimizing transaction management in distributed processing systems using separation of global and local transaction tokens, according to some implementations of the current subject matter; and, FIG. 6 illustrates an exemplary process, according to some implementations of the current subject matter.

FIG. 5 illustrates a system 500 for separating global and local transaction tokens, according to some implementations of the current subject matter. Here, as in FIG. 4, statement-level snapshot isolation may be assumed. In this case, each transaction slave 203 (as represented by the slave transaction manager 406) may be configured to manage its own local transaction token(s) independently of global transaction token(s). In some implementations, the update transaction may update its own local transaction token if it is single-transaction-slave transaction.

In some implementations, each database record may have two TID (or CID) columns for MVCC version filtering: one for global TID and another for local TID, as shown in FIG. 5 (columns 504 and 506, respectively). For illustrative purposes only, FIG. 5 shows TID columns. For local transactions, the local TID may be read or updated. For global transactions, either global or local TIDs may be read (in some implementations, global TID may be read if there is value in its global TID column; otherwise, local TID may be read) and both global and local TIDs may be updated. Thus, global transactions may carry two snapshot transaction tokens: one for global transaction token and another for the transaction slave's local transaction token.

In a log record, both global and local TIDs may be recorded for a global transaction. During recovery, the local transactions' commit may be decided using its own local commit log record. The master transaction manager 402 (shown in FIG. 4) may be accessed only for global transaction but not for local transactions.

Figure 6:
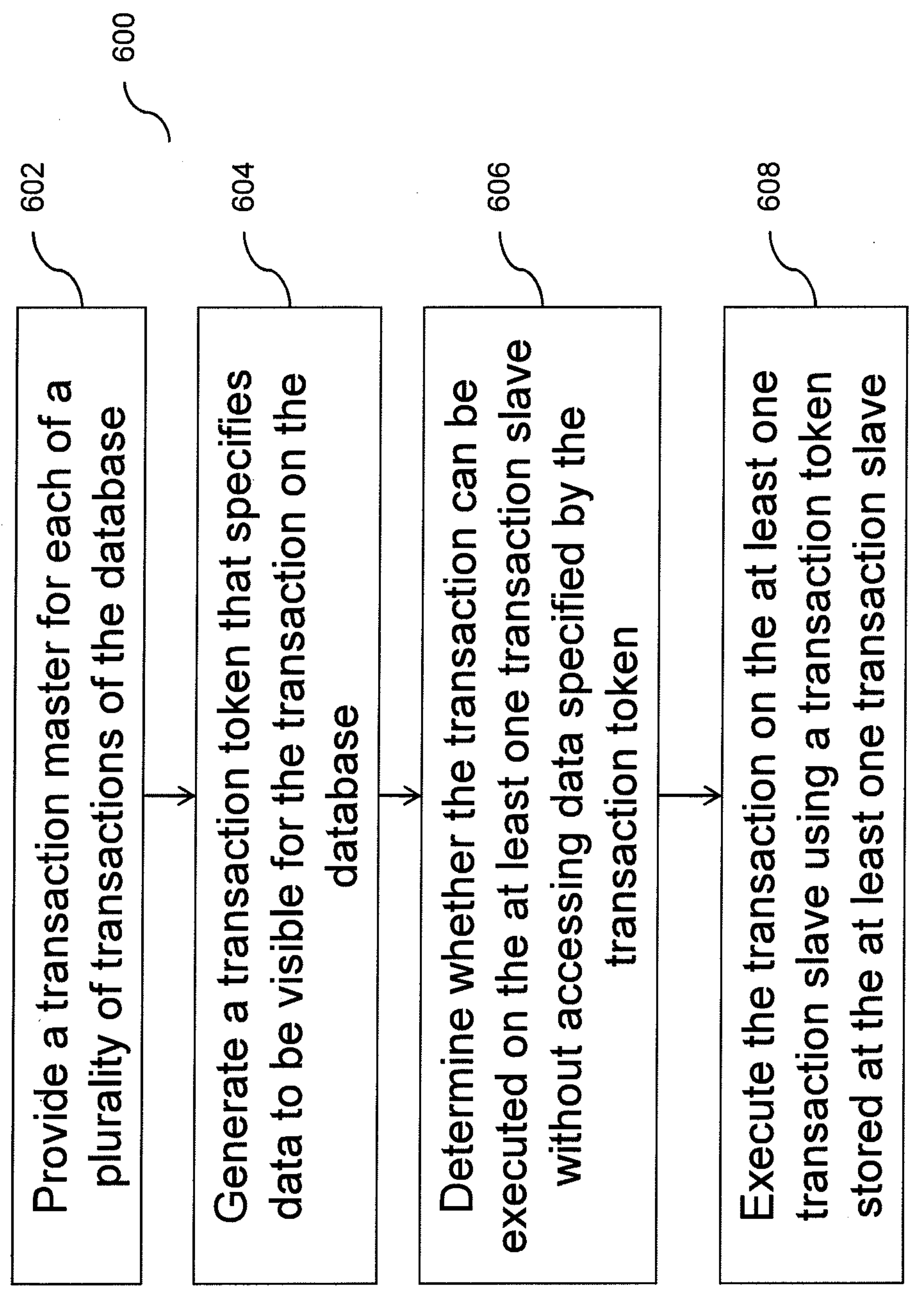

FIG. 6 illustrates an exemplary process 600, according to some implementations of the current subject matter. At 602, a transaction master for each of a plurality of transactions of the database may be provided, wherein each transaction master is configured to communicate with at least one transaction slave to manage execution a transaction in the plurality of transactions. At 604, a transaction token that specifies data to be visible for the transaction on the database can be generated, where the transaction token may include a transaction identifier for identifying committed transactions and uncommitted transactions, wherein the transaction master is configured to update the transaction token after execution of the transaction. At 606, a determination may be made whether the transaction can be executed on the at least one transaction slave without accessing data specified by the transaction token. At 608, the transaction may be executed on the at least one transaction slave using a transaction token stored at the at least one transaction slave.

The subject matter described herein may be embodied in systems, apparatus, methods, and/or articles depending on the desired configuration. Embodiments of the subject matter described herein may be realized in digital electronic circuitry, integrated circuitry, specially designed application specific integrated circuits ("ASICs"), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device and at least one output device.

These computer programs, which may also be referred to as programs, software, software applications, applications, components or code, may include without limitation machine instructions for a programmable processor. Embodiments of these computer programs may be implemented in a high-level procedural and/or object-oriented programming language and/or in assembly/machine language. As used herein, the term "machine-readable medium" refers to any computer program product, apparatus and/or device, including but not limited to magnetic discs, optical disks, memory and Programmable Logic Devices ("PLDs"), used to provide machine instructions and/or data to a programmable processor, including without limitation a machine-readable medium that receives machine instructions as a machine-readable signal. The term "machine-readable signal" may refer to any signal used to provide machine instructions and/or data to a programmable processor. The machine-readable medium may store machine instructions non-transitorily, as would a non-transient solid state memory, magnetic hard drive or any equivalent storage medium. The machine-readable medium may alternatively or additionally store machine instructions in a transient manner, as would, for example, a processor cache or other random access memory associated with one or more physical processor cores.

Processors suitable for the execution of a computer program include, by way of example, both general and special purpose microprocessors and any one or more processors of any kind of digital computer. Generally, a processor will receive instructions and data from read-only memory ("ROM"), random access memory ("RAM") or both. The essential elements of a computer are a processor for executing instructions and one or more memory devices for storing instructions and data. Generally, a computer will also include, or be operatively coupled to receive data from and/or transfer data to one or more mass storage devices for storing data, e.g., magnetic, magneto-optical disks or optical disks. Media suitable for embodying computer program instructions and data include all forms of volatile (e.g., RAM) or non-volatile memory, including by way of example only semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein may be implemented on a computer having a display device, such as for example a cathode ray tube ("CRT") or a liquid crystal display ("LCD") monitor for displaying information to the user. The computer may also have a keyboard and/or pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback or tactile feedback. Similarly, input from the user to the computer may be received in any form, including but not limited to visual, auditory or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user may interact with an implementation of the subject matter described herein, or any combination of such back-end, middleware, or front-end components. The components of the system may be interconnected by any form or medium of digital data communication, such as for example a communication network. Examples of communication networks include, but are not limited to, a local area network ("LAN"), a wide area network ("WAN") and/or the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the embodiments described above may be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other embodiments may be within the scope of the appended claims.

What is claimed:

1. A computer-implemented method, the method comprising:

providing a transaction master for each of a plurality of transactions of a database, wherein each transaction master is configured to communicate with at least one transaction slave to manage execution of a transaction in the plurality of transactions;

generating a transaction token that specifies data to be visible for the transaction on the database, the transaction token including a transaction identifier for identifying committed transactions and uncommitted transactions, wherein the transaction master is configured to update the transaction token after execution of the transaction;

determining whether the transaction can be executed on the at least one transaction slave without accessing the transaction master including data specified by the transaction token and at least one other transaction slave;

executing the transaction on the at least one transaction slave using a cached transaction token stored at the at least one transaction slave, wherein a database record associated with the at least one transaction slave of the transaction includes the cached transaction token and a copy of the transaction token comprising a global transaction token; and updating the cached transaction token using a new transaction token, wherein the new transaction token corresponds to the transaction committed on the at least one transaction slave.

2. The computer-implemented method according to claim 1, wherein the generating, the providing, the determining, the updating, and the executing are performed on at least one processor.

3. The computer-implemented method according to claim 1, wherein the global transaction token is maintained by the transaction master.

4. The computer-implemented method according to claim 3, further comprising:

determining whether execution of the transaction uses at least another transaction slave; and executing the transaction using the global transaction token on the transaction master.

5. A non-transitory computer program product comprising a machine-readable medium storing instructions that, when executed by at least one programmable processor, cause the at least one programmable processor to perform operations comprising:

providing a transaction master for each of a plurality of transactions of a database, wherein each transaction master is configured to communicate with at least one transaction slave to manage execution of a transaction in the plurality of transactions;

generating a transaction token that specifies data to be visible for the transaction on the database, the transaction token including a transaction identifier for identifying committed transactions and uncommitted transactions, wherein the transaction master is configured to update the transaction token after execution of the transaction;

determining whether the transaction can be executed on the at least one transaction slave without accessing the transaction master including data specified by the transaction token and at least one other transaction slave;

executing the transaction on the at least one transaction slave using a cached transaction token stored at the at least one transaction slave, wherein a database record associated with the at least one transaction slave of the transaction includes the cached transaction token and a copy of the transaction token comprising a global transaction token; and updating the cached transaction token using a new transaction token, wherein the new transaction token corresponds to the transaction committed on the at least one transaction slave.

6. The non-transitory computer program product according to claim 5, wherein the global transaction token is maintained by the transaction master.

7. The non-transitory computer program product according to claim 6, wherein the operations further comprise:

determining whether execution of the transaction uses at least another transaction slave; and executing the transaction using the global transaction token on the transaction master.

8. A system comprising:

at least one programmable processor; and a machine-readable medium storing instructions that, when executed by the at least one programmable processor, cause the at least one programmable processor to perform operations comprising:

providing a transaction master for each of a plurality of transactions of a database, wherein each transaction master is configured to communicate with at least one transaction slave to manage execution of a transaction in the plurality of transactions;

generating a transaction token that specifies data to be visible for the transaction on the database, the transaction token including a transaction identifier for identifying committed transactions and uncommitted transactions, wherein the transaction master is configured to update the transaction token after execution of the transaction;

determining whether the transaction can be executed on the at least one transaction slave without accessing the transaction master including data specified by the transaction token and at least one other transaction slave;

executing the transaction on the at least one transaction slave using a cached transaction token stored at the at least one transaction slave, wherein a database record associated with the at least one transaction slave of the transaction includes the cached transaction token and a copy of the transaction token comprising a global transaction token; and updating the cached transaction token using a new transaction token, wherein the new transaction token corresponds to the transaction committed on the at least one transaction slave.

9. The system according to claim 8, wherein the global transaction token is maintained by the transaction master.

10. The system according to claim 9, wherein the operations further comprise:

determining whether execution of the transaction uses at least another transaction slave; and executing the transaction using the global transaction token on the transaction master.

* * * * *